Patented Sept. 27, 1938

2,131,362

UNITED STATES PATENT OFFICE 2,131,362

METHYLENE HALIDE DERIVATIVES OF CARBOXYLIC ACID AMIDES, AND CARBAMIC ESTERS, RESPECTIVELY, AND PROCESS OF MAKING THE SAME

Alfred William Baldwin and Henry Alfred Piggott, Blackley, Manchester, England, assignors to Imperial Chemical Industries Limited, a corporation of Great Britain No Drawing. Application February 18, 1937, Serial No. 126,478. In Great Britain February 27, 1936

12 Claims. (Cl. 260—482)

This invention relates to the manufacture of new chemical compounds.

According to the invention we manufacture new compounds containing combined halogen by a process which comprises interacting a hydrogen halide, a carboxylic acid amide or carbamic ester of the general formula R—CONH—R' or RO—CONH—R', where R and R' each represent an aliphatic or cycloaliphatic hydrocarbon residue, and formaldehyde.

The term "formaldehyde" is intended to include also such polymers of formaldehyde as, for example, para-formaldehyde.

The reaction is preferably carried out in the presence of an inert solvent, that is, a solvent which does not readily react with the reagents to be used. A convenient solvent for this purpose is, for example, benzene. If high yields of the new compounds are to be obtained, it is advantageous to carry out the reaction in the absence of water, other than that produced in the reaction. Indeed, from this point of view it is frequently advantageous to so arrange the procedure that the water of reaction is removed from the reaction mixture as formed, for example, by distilling it off continually from the reaction mixture as an azeotropic mixture with a suitable solvent, for example, benzene.

Suitable starting materials for the process of the present invention are, for example, stearomethylamide, methyl undecylcarbamate, methyl heptodecylcarbamate, methyl butylcarbamate, acetoundecylamide and laurocyclohexylamide.

In general the new halogen compounds are oils or low-melting solids which are soluble in organic solvents such as, for example, benzene or petroleum ethers. As already indicated, the new compounds contain combined halogen and as a result the new compounds are highly reactive. Thus, the new compounds are more or less readily decomposed or hydrolyzed by water and react readily with amines. Analysis of the new halogen-containing compounds when pure agrees closely with the general formula R—CO—NCH₂Hal or RO—CO NCH₂Hal
     \R'                \R' according as an amide or a carbamic ester has been used as starting material, where R and R' have the significance already given and Hal stands for halogen.

When the new halogen-containing compounds are interacted with tertiary amines, particularly with cycloaliphatic or heterocyclic tertiary amines such as, for example, pyridine, quinoline, they yield new water-soluble compounds which from their properties and analysis are quaternary ammonium salts agreeing with one or the other (according to the halogen-containing compound used) of the following formulae R—CO—N—CH₂ N(tert)Hal
       \R'

RO—CO—N—CH₂ N(tert)Hal
        \R₁ where R, R' and Hal have the significance hereinbefore given and where —N(tert) represents the nitrogen atom of a tertiary amine.

Both the new halogen compounds made according to the invention and also the water-soluble quaternary salts derived from the said halogen compounds are useful in textile-treatment processes.

The invention is illustrated but not limited by the following examples in which the parts are by weight.

Example 1

25 parts of stearomethylamide, which may be made by interacting stearic acid or stearyl chloride with methylamine, and 2.6 parts of para-formaldehyde are suspended in 150 parts of dry benzene. Gaseous hydrogen chloride is passed into the stirred mixture, keeping the temperature below 10° C. until saturation point is reached and no solid remains undissolved in the benzene. 20 parts of freshly dehydrated magnesium sulphate are then added to absorb the water which will be produced when the temperature of the benzene solution is slowly raised to boil. After heating at the boil for 5 to 10 minutes the reaction mixture is filtered and the benzene evaporated from the filtrate. The residue so obtained is extracted with petroleum ether (B. P. 40°-60° C.), the ether extract after standing at 15°-20° C. for a short time is filtered and the product recovered from the filtrate by evaporating the petroleum ether, preferably under reduced pressure. The product so obtained is a low-melting, waxy solid containing combined chlorine which fumes somewhat in moist air. The new compound is believed to be N-methylstearamidomethyl chloride, and to have the formula

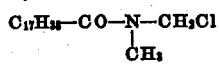

Example 2

30 parts of methyl heptadecylcarbamate (American Chemical Journal 1899, 22, 14) and 3 parts of para-formaldehyde are suspended in 100 parts of dry benzene. Gaseous hydrogen chloride is passed into the stirred mixture, keeping the temperature below 10° C. until a clear benzene solution saturated with hydrogen chloride is obtained. Water is produced in the reaction which takes place and the reaction mixture separates into two layers. The lower aqueous layer is removed and the upper benzene layer is dried by standing over calcium chloride. The dried benzene solution is filtered and the product recovered from the filtrate by evaporating the benzene, preferably under reduced pressure. The product is a colourless oil containing combined chlorine. It tends to crystallize on standing at atmospheric temperature and fumes in moist air. The new compound is believed to be N-carbomethoxyheptadecylaminomethyl chloride and to have the formula

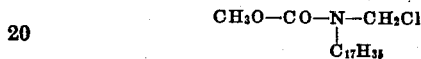

Example 3

25 parts of methyl undecylcarbamate (American Chemical Journal, 1899, 22, 14) and 5 parts of para-formaldehyde are suspended in 120 parts of dry benzene. Gaseous hydrogen chloride is passed into the stirred mixture, keeping the temperature below 10° C., until a clear benzene solution saturated with hydrogen chloride is obtained. Water is produced in the reaction and the reaction mixture separates into two layers. The lower aqueous layer is removed and the upper benzene layer is dried by standing over calcium chloride and the product is isolated by evaporating the benzene, preferably under reduced pressure. The product is a light coloured oil, and can be distilled as a colourless oil B. P. 98° C. under a pressure of 10-3 mm. of mercury. It fumes in moist air, and is obtained in 66% yield of distilled material. The new compound is believed to be N-carbomethoxy-undecylaminomethyl chloride, and to have the formula

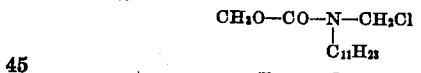

Example 4

20 parts of methyl butylcarbamate (Receuil des travaux chimiques des Pays-Bas 1895, 14, 18) and 8 parts of para-formaldehyde are suspended in 120 parts of dry benzene. Gaseous hydrogen chloride is passed into the stirred mixture, keeping the temperature below 10° C., until a clear benzene solution saturated with hydrogen chloride is obtained. Water is produced in the reaction, and the reaction mixture separates into two layers, the lower aqueous layer being then removed and the upper benzene layer dried over calcium chloride. The product is recovered by evaporating the benzene from the dried benzene layer and distilling the residue. The product boils at 28° C. under a pressure of 10-3 mm. of mercury and is obtained in a 66% yield of distilled material. The new compound is believed to be N-carbomethoxy-butylaminomethyl chloride, and to have the formula

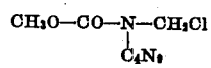

Example 5

12 parts of acetoundecylamide (which may be made by the interaction of undecylamine and acetyl chloride) and 2 parts of para-formaldehyde are suspended in 60 parts of dry benzene. Gaseous hydrogen chloride is passed into the stirred mixture, keeping the temperature below 10° C. until a clear benzene solution saturated with hydrogen chloride is obtained. The benzene solution is dried over calcium chloride and evaporated to dryness. The residue so obtained is extracted with petroleum ether, B. P. 40-60° C. and the ether extract after standing at 15-20° C. for a short time is filtered and the product recovered from the filtrate by evaporating the petroleum ether, preferably under reduced pressure. The new compound so-obtained is believed to be N-acetoundecylamidomethyl chloride and to have the formula

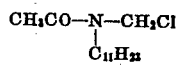

Example 6

9 parts of stearomethylamide and 3 parts of paraformaldehyde are suspended in 200 parts of boiling benzene in a vessel fitted with a suitable condenser arranged for distillation. Gaseous hydrogen chloride is passed in, and the water produced in the reaction allowed to distil off as an azeotropic mixture with benzene and so be removed from the reaction mixture. This procedure is continued until water no longer distils over with the benzene. The reaction mixture is then cooled, filtered and the filtrate is evaporated to dryness. The residue so-obtained is extracted with petroleum ether (B. P. 40-60° C.), the ether extract after standing at 15-20° C. for a short time is filtered and the product recovered from the filtrate by evaporating the petroleum ether, preferably under reduced pressure. The product so-obtained is a low-melting, waxy solid identical in behaviour with the product of Example 1 and has a similar composition, that is, it is believed to be N-methylstearamidomethyl chloride.

Example 7

If in Example 1 gaseous hydrogen bromide is used in place of hydrogen chloride there is obtained a yellow crystalline solid which contains combined bromine and which reacts readily with tertiary amines, e. g. pyridine, in the cold. The new bromine-containing compound is believed to be N-methylstearamidomethyl bromide, that is, to correspond to the formula

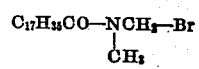

Example 8

10 parts of laurocyclohexylamide (M. P. 75-76° C., obtained by interaction of lauric acid chloride and cyclohexylamine) are mixed with 4.4 parts of para-formaldehyde and 150 parts of dry benzene in a vessel fitted with a suitable condenser arranged for distillation. The temperature is raised until the reaction mixture boils gently and dry hydrogen chloride gas passed in.

Water is formed in the reaction which takes place and is allowed to distil over slowly as an azeotropic mixture with benzene. The passing of hydrogen chloride and the slow distillation is proceeded with until no more water passes over, that is, until the distillate comes over clear. The residual benzene is evaporated from the reaction mixture under diminished pressure, the cooled residue is extracted with cold dry ether and filtered. By evaporating the ethereal filtrate there is obtained a new chlorine-containing compound N-cyclohexyllauramidomethyl chloride corresponding to the formula

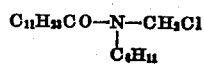

If pyridine is added to the ethereal filtrate obtained as above there is precipitated a quaternary pyridinium salt which may be filtered off. This quaternary salt is soluble in cold water to give foaming solutions which solutions lose their foaming power when boiled.

We claim:

1. Process for the manufacture of new compounds containing combined halogen which comprises interacting a hydrogen halide, a compound of the group consisting of carboxylic acid amides and carbamic esters of the respective general formulas R—CONH—R' or RO—CONH—R', where R and R' each represent radicals selected from the group consisting of aliphatic and cycloaliphatic hydrocarbon radicals, and formaldehyde.

2. Process according to claim 1 wherein the reaction is carried out in the presence of an inert organic solvent as diluent.

3. Process according to claim 1 wherein the water of reaction as formed is removed by distillation as an azeotropic mixture with an inert organic solvent.

4. Process according to claim 1, wherein the water of reaction as formed is removed by the aid of a dehydrating agent.

5. Organic compounds containing combined halogen, and being substantially identical with the compounds obtainable according to the process defined in claim 1.

6. New compounds having the general formula

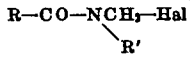

where R and R' each stand for a radical of the group consisting of aliphatic and cycloaliphatic hydrocarbon radicals, and Hal stands for halogen.

7. New compounds having the general formula

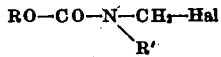

where R or R' each stand for a radical of the group consisting of aliphatic and cycloaliphatic radicals, and Hal stands for halogen.

8. The new compound N-methylstearamidomethyl chloride having the formula

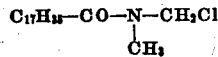

9. The new compound N-carbomethoxyheptadecylaminomethyl chloride having the formula

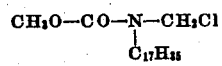

10. A compound of the general formula

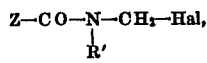

wherein Z stands for a radical of the group consisting of alkyl and alkoxy, R' stands for a radical of the group consisting of alkyl and cycloalkyl, and "Hal" stands for halogen, said compound being soluble in benzene and petroleum ether, being decomposed by water, and being capable of reacting with amines to give the corresponding ammonium halide compounds.

11. A process for the manufacture of chemical compounds as defined in claim 10, which comprises passing hydrogen chloride into a mixture of benzene, paraformaldehyde, and a compound of the general formula Z—CONH—R', wherein Z stands for a radical of the group consisting of alkyl and alkoxy and R' stands for a radical of the group consisting of alkyl and cycloalkyl.

12. A process as in claim 11, being carried out under conditions whereby water of formation is removed continually during the course of the reaction.

ALFRED WILLIAM BALDWIN.
HENRY ALFRED PIGGOTT.